United States Patent
Galloway et al.

(10) Patent No.: US 8,723,494 B2
(45) Date of Patent: May 13, 2014

(54) SWITCHING POWER CONVERTER CURRENT LIMIT REFERENCE CIRCUIT

(75) Inventors: Gavin Galloway, Stepps (GB); Michael McPartlin, Bothwell (GB)

(73) Assignee: Analog Devices, Inc., Norwood, MA (US)

( * ) Notice: Subject to any disclaimer, the term of this patent is extended or adjusted under 35 U.S.C. 154(b) by 515 days.

(21) Appl. No.: 13/152,624

(22) Filed: Jun. 3, 2011

(65) Prior Publication Data

US 2012/0308218 A1 Dec. 6, 2012

(51) Int. Cl.
*H02M 3/156* (2006.01)
(52) U.S. Cl.
USPC .......................................... 323/282; 323/284
(58) Field of Classification Search
USPC ......... 323/222, 276, 277, 282, 283, 284, 285, 323/351, 908; 361/93.9
See application file for complete search history.

(56) References Cited

U.S. PATENT DOCUMENTS

| | | | | |
|---|---|---|---|---|
| 7,288,924 | B2* | 10/2007 | Trandafir et al. | 323/283 |
| 8,598,855 | B2* | 12/2013 | Bucur et al. | 323/282 |
| 2013/0021009 | A1* | 1/2013 | Waltman et al. | 323/271 |

* cited by examiner

*Primary Examiner* — Gary L Laxton
(74) *Attorney, Agent, or Firm* — Schwegman Lundberg & Woessner, P.A.

(57) ABSTRACT

A switching power converter current limit reference circuit generates an output-referred input current reference (or an input-referred output current reference) which takes into account a converter's input voltage, output voltage, and efficiency, thereby enabling implementation of a DC, or average, input current regulation scheme. A reference current (Iref) is provided which represents the desired average current limit. Circuitry multiplies Iref and the complement of the converter's duty cycle D (1-D) together. When Iref represents a desired input current limit, the resulting product represents the average output current achievable when Iref=Iin for the prevailing duty cycle D. When Iref represents a desired output current limit, the resulting product represents the average input current achievable when Iref=Iout for prevailing duty cycle D.

14 Claims, 2 Drawing Sheets

SWITCHING POWER CONVERTER CURRENT LIMIT REFERENCE CIRCUIT

BACKGROUND OF THE INVENTION

1. Field of the Invention

This invention relates to the field of switching power converters, and particularly to circuits for generating a reference that can be used to limit the converter's input or output current.

2. Description of the Related Art

Switching power converters often are equipped with one or more current limiting circuits. For example, a switching power converter's input and/or output current may be limited to prevent damage to one or more circuit components, or for the purpose of minimizing power consumption.

One way in which current limiting is provided in switching power converters is with the use of a peak current limiting scheme. For example, for a DC-DC boost converter having a current-mode architecture, the inductor current is compared against a fixed reference, and if the current exceeds the reference, the power switch on-time is terminated. This method allows inductor current to be regulated to the peak current limit; the comparator output can also be used to indicate that the peak current limit has been exceeded.

A similar technique can be implemented for valley-current converters. This method of current detection and limiting addresses peak or valley current in the inductor, rather than DC current. This means that the effective DC current load on the system while operating in a current-limiting mode will vary with inductor value, switching frequency and the converter's input and output voltage. In addition, due to the ripple current in the inductor, peak or valley limiting schemes such as those described above can result in the effective DC (or average) current limit varying with the input and output voltages of the converter, as well as with variations in inductor value and changes in the duty cycle.

Another technique which may be used for current limiting in a DC-DC boost converter is to use information obtained from the output of the error amplifier in the control loop. This signal contains information about the peak inductor current (or valley current) in a current-mode converter. This method of current detection and limiting suffers from the same limitations as the peak (or valley) current limiting method described above.

SUMMARY OF THE INVENTION

A switching power converter current limit reference circuit is presented which overcomes the limitations discussed above. An output-referred input current reference (or an input-referred output current reference) is generated which takes into account a converter's input voltage, output voltage, and efficiency, thereby enabling implementation of a DC, or average, input current regulation scheme.

The present current limit reference circuit is for use with a switching power converter that has an associated input current (Iin), an associated output current (Iout), an associated desired average current limit for one of the input and output currents, and an associated duty cycle D. A reference current (Iref) is provided which represents the desired average current limit. Circuitry is then provided which multiplies a value proportional to Iref and a value proportional to the complement of the duty cycle D (1-D). When Iref represents a desired input current limit, the resulting product represents the average output current achievable when Iref=Iin for the prevailing duty cycle D. Similarly, when Iref represents a desired output current limit, the resulting product represents the average input current achievable when Iref=Iout for the prevailing duty cycle D. In addition to being useful for establishing an input or output current limit, the present scheme can be used with many switching converter topologies, including boost and buck converters.

A current limit reference so generated would typically be provided to a comparison circuit, along with the current to which the reference is referred. For example, for an output-referred input current reference, Iref represents a desired input current limit, and a low-pass filtered version of the product of Iref and 1-D is provided to the comparison circuit along with a signal which represents the output current (Iout). The output of the comparison circuit then indicates whether Iout is greater than or less than Iref, and this output can be used to create, for example, an input current regulation loop or an input current limiting or monitoring circuit.

This present scheme, which effectively converts an input current reference to an output current reference, is useful in any case where the input current is not known or is difficult to know, but the output current is known. This is the case, for example, with a camera flash driver circuit application, in which a boost converter powers a current source which drives a flash that runs at a known current, and the input current of the boost converter simply scales to meet that requirement. This method of reference conversion can also be applied, in reverse, to a buck converter, in which an output current limit could be realized by monitoring the input current and comparing against a converted reference. In addition, it can be applied to create an output current limit for a boost converter, in inverse, by monitoring input current and comparing against a reference which is divided by (instead of multiplied by) the complement of the duty cycle.

Further features and advantages of the invention will be apparent to those skilled in the art from the following detailed description, taken together with the accompanying drawings.

DETAILED DESCRIPTION OF THE INVENTION

The present switching power converter current limit reference circuit generates an output-referred input current reference (or an input-referred output current reference) which enables the implementation of a DC, or average, current regulation scheme for the converter. The present current limit reference circuit is for use with a switching power converter that has an associated input current (Iin), an associated output current (Iout), an associated desired average current limit for Iin or Iout, and an associated duty cycle D. It can be used with a variety of converter types, including boost and buck converters.

Figure 1:
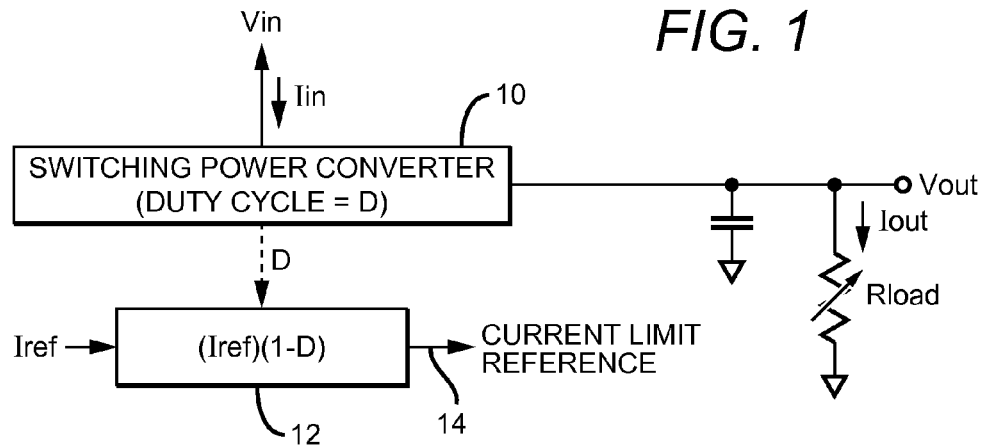
FIG. 1 is a block/schematic diagram of a current limit reference circuit per the present invention.

The basic principles of a switching power converter current limit reference circuit in accordance with the present invention are shown in FIG. 1. The current limit reference circuit is used with a switching converter 10, which has an associated input current Iin, an associated output current Iout, an associated desired average current limit for Iin or Iout, and an associated duty cycle D. Converter 10 is powered by a supply voltage Vin, and produces an output Vout which drives a load represented in FIG. 1 with a resistance Rload.

In the discussion below, the generation of an output-referred input current reference for a boost converter is used as a primary example, though it is understood that the invention is applicable to other converter and reference types as well.

For a boost converter requiring an input current limiting scheme, the present circuit takes advantage of situations in which the output current of a boost converter is known, such as in an LED driver application, to create an output-referred input current limit reference that can be used to provide a DC input current limit or input current regulator. This is achieved by performing the comparison or regulation on the output current, thus indirectly influencing input current. To facilitate this regulation at the output, an output-referred input current reference is needed, which indicates the output current achievable from the allowable input current. Input current Iin in a DC-DC boost converter is defined by the equation:

$$Iin=(Vout/Vin)*(Iout/Eff) \quad (1)$$

where Eff is the converter efficiency. The input current limit (Iin(target)) can be converted to an equivalent output current target, taking into account input voltage, output voltage, and converter efficiency as follow:

$$Iout(target)=Iin(target)*Eff*(Vin/Vout) \quad (2)$$

The resulting target output current is an output-referred input current reference, which can be used in conjunction with the actual output current to create an input current limit, input current regulator, or a flag indicating that an input current level has been exceeded.

In this boost converter example, the output-referred input current reference is implemented based on the following equation:

$$Eff*(Vin/Vout)=1-D \quad (3)$$

where D is the boost converter duty cycle. Combining this with equation 2 gives:

$$Iout(target)=Iin(target)*(1-D) \quad (4)$$

Thus, the output-referred input current reference can be obtained by multiplying the input current limit by the complement of the converter's duty cycle (1-D), which is typically a readily available logic signal. This calculation is performed by a current limit reference circuit 12 in FIG. 1. A signal Iref, representing either a desired average input current limit or average output current limit, is presented to circuit 12, along with duty cycle value D derived from the operation of switching converter 10. Current limit reference circuit 12 is arranged to multiply Iref and the complement of duty cycle D (i.e., 1-D) such that, when Iref represents a desired input current limit, the resulting product represents the average output current achievable when Iref=Iin for the prevailing duty cycle D (in which case the product is an output-referred input current limit reference 14), and when Iref represents a desired output current limit, the resulting product represents the average input current achievable when Iref=Iout for the prevailing duty cycle D (in which case the product is an input-referred output current limit reference).

Figure 2:
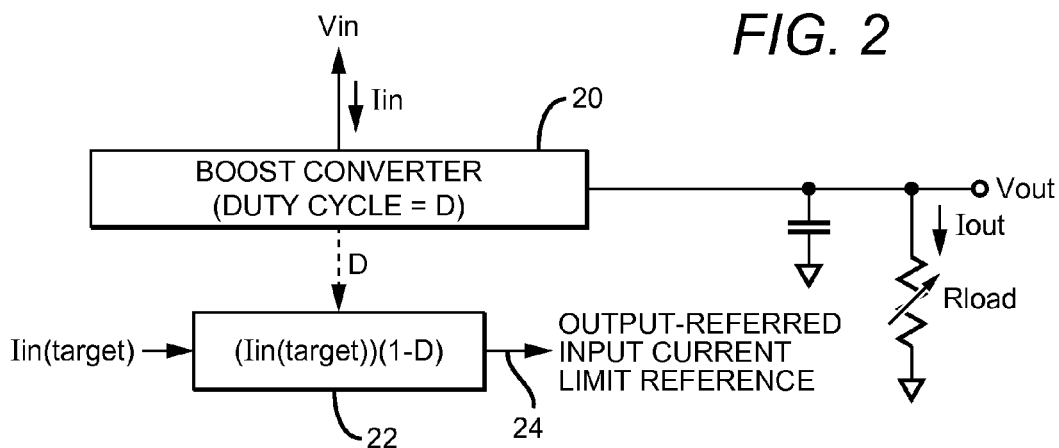
FIG. 2 is a block diagram of a circuit which produces an output-referred input current limit reference circuit for a boost converter in accordance with the present invention.

As noted above, the present current limit reference circuit can be adapted to generate an output-referred input current reference or an input-referred output current reference, for any of a variety of switching converter types. For example, in FIG. 2, the switching converter is a boost converter 20, and the current limit reference circuit 22 generates an output-referred input current limit reference 24. A signal Iin(target), representing a desired average input current limit, is presented to circuit 22, along with duty cycle value D derived from the operation of boost converter 20. Current limit reference circuit 22 is arranged to multiply Iin(target) and the complement of duty cycle D (1-D) such that the resulting product represents the average output current achievable when Iin(target)=Iin for the prevailing duty cycle D.

Figure 3:
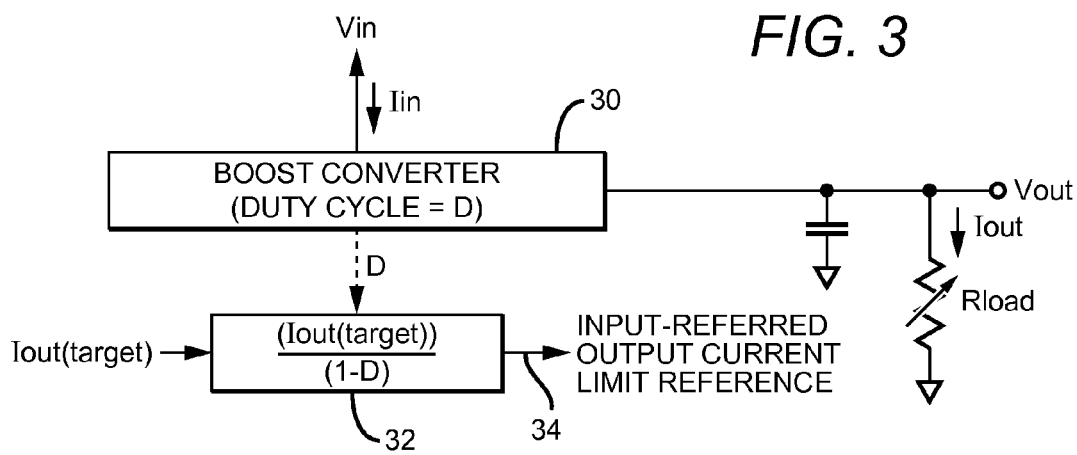
FIG. 3 is a block diagram of a circuit which produces an input-referred output current limit reference circuit for a boost converter in accordance with the present invention.

Similarly, in FIG. 3 the switching converter is a boost converter 30, and the current limit reference circuit 32 generates an input-referred output current limit reference 34. A signal Iout(target), representing a desired average output current limit, is presented to circuit 32, along with duty cycle value D derived from the operation of boost converter 30. Current limit reference circuit 32 is arranged to divide Iout(target) by the complement of duty cycle D (1-D) such that the resulting product represents the average input current achievable when Iout(target)=Iout for the prevailing duty cycle D.

Figure 4:
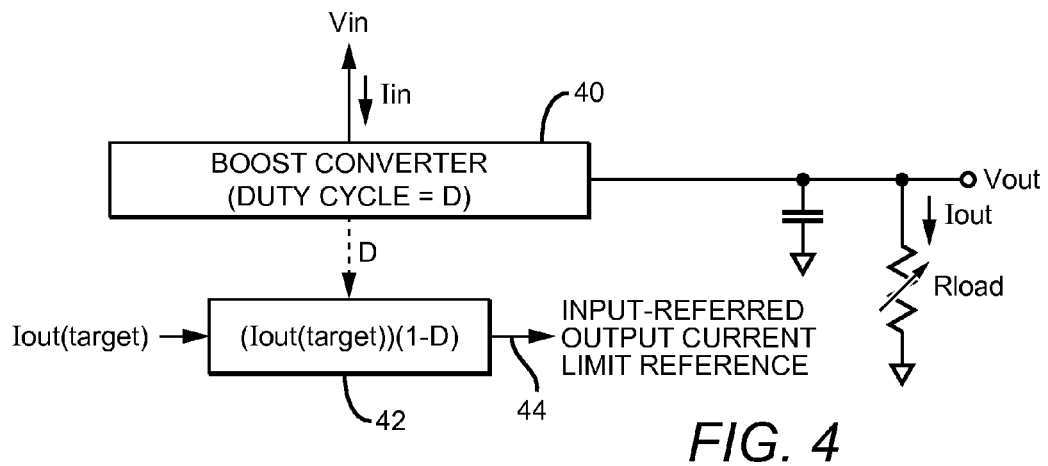
FIG. 4 is a block diagram of a circuit which produces an input-referred output current limit reference circuit for a buck converter in accordance with the present invention.

An example featuring a buck converter 40 is shown in FIG. 4, in which the current limit reference circuit 42 generates an input-referred output current limit reference 44. A signal Iout(target), representing a desired average output current limit, is presented to circuit 42, along with duty cycle value D derived from the operation of boost converter 40. Current limit reference circuit 42 is multiplies a Iout(target) and (1-D) such that the resulting product represents the average input current achievable when Iout(target)=Iout for the prevailing duty cycle D.

Figure 5:
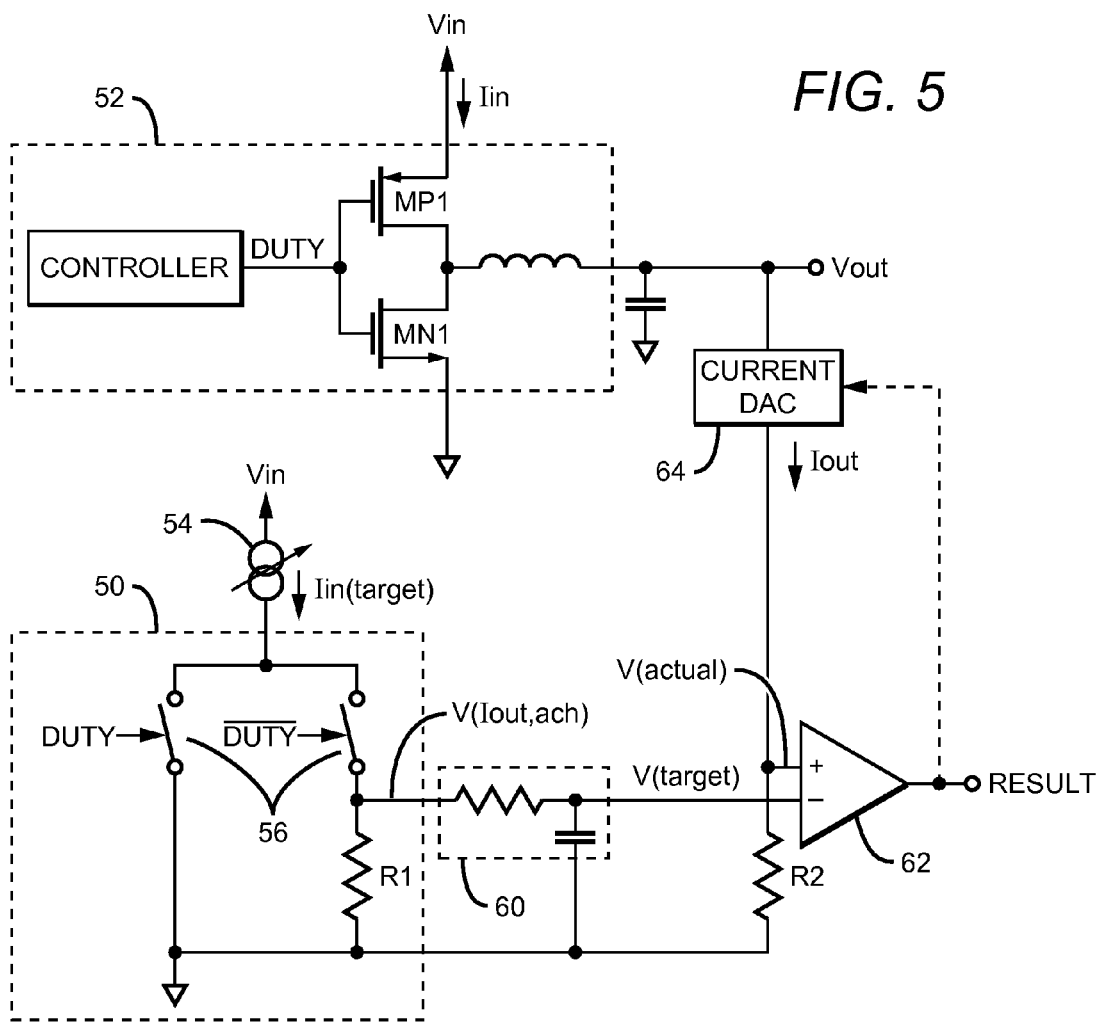
FIG. 5 is a schematic diagram of a circuit which produces an output-referred input current limit reference circuit for a boost converter in accordance with the present invention.

One possible implementation of a current limit reference circuit 50 which generates an output-referred input current limit reference for a boost converter 52 is shown in FIG. 5. A simplified implementation of boost converter 52 is shown, which includes PMOS and NMOS switching transistors MP1 and MN1, whose gates are driven by a signal DUTY. A signal Iin(target) representing the input current limit is provided by a current source 54. In this implementation, the multiplication is achieved by using a switching means 56 to periodically switch Iin(target) through a resistance R1, which results in a square-wave signal at node 58, the average voltage of which (V(Iout,ach)) is proportional to Iin(target), and which represents the average output current achievable when Iin(target)=Iin for the prevailing duty cycle D. The switching is done synchronously with the operation of the boost converter: Iin(target) is directed through resistance R1 when NMOS FET MN1 is off and current is being delivered to the output of the boost converter, and is diverted to ground when MN1 is on.

The square-wave voltage signal V(Iout,ach) at node 58 can be considered an output-referred input current limit reference signal. However, to make this signal useful, it is preferably filtered using a filter such as low-pass filter 60, which converts the square wave to an approximately continuous voltage proportional to Iin(target)·(1-D). This voltage, V(target), represents the output current which will be achieved by the converter when Iin=Iin(target) with the prevailing duty cycle D. By creating a similar voltage V(actual) representing actual output current Iout (by, for example, forcing a current representative of Iout through a resistance R2 similar to R1), V(target) and V(actual) can be used to create an input current regulation loop or an input current limiting or monitoring circuit.

To provide input current limiting or regulation, V(target) and V(actual) are preferably compared using a comparison circuit, which produces an output that indicates whether V(target) is greater or less than V(actual), and thus whether the average input current limit has been reached; this function is implemented with a voltage comparator 62 in FIG. 5.

In this implementation, the boost converter is used to boost supply voltage Vin to provide a supply rail for a current source, here implemented with a current DAC 64 which defines the converter's output current Iout. The output-referred input current reference is compared against the output current using voltage comparator 62, and the resulting digital signal (RESULT) is used to control current DAC 64. This provides a current limiting feature, with the additional benefit that the output current achieved can be read back digitally by the system, providing information about the average output current achievable under the present conditions.

Note that the embodiments depicted in FIGS. 1-5 are merely exemplary. As noted above, the present current limit reference circuit can be adapted for use with any switching converter application in which the input current is not known or is difficult to know, but the output current is known. This is the case, for example, with a camera or cell phone flash driver circuit application, in which a boost converter powers a current source which drives an LED flash that runs at a known current, and the input current of the boost converter simply scales to meet that requirement. An accurate input current limit in this case allows the camera or cell phone designer to set the maximum LED current, and allow the input current limiter to take care of ensuring that the flash driver does not exceed the current budget. This means that the flash will always be at maximum possible brightness under the prevailing conditions (boost converter efficiency, LED forward voltage, etc.).

As discussed above, the present circuit can also be adapted for use with any switching converter application in which the output current is not known or is difficult to know, but the input current is known.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A current limit reference circuit for a switching power converter, comprising:
a switching power converter which has an associated input current Iin, an associated output current Iout, an associated desired average current limit for one of said input and output currents, and an associated duty cycle D;
a reference current Iref representing said desired average current limit; and
circuitry arranged to multiply Iref and the complement of said duty cycle D (1-D) such that, when Iref represents a desired input current limit, the resulting product represents the average output current achievable when Iref=Iin for the prevailing duty cycle D, and when Iref represents a desired output current limit, the resulting product represents the average input current achievable when Iref=Iout for the prevailing duty cycle D.

2. The current limit reference circuit of claim 1, wherein said switching power converter is a boost converter and Iref represents an associated desired average input current limit, said circuitry arranged to multiply Iref and the complement of duty cycle D such that the resulting product represents the average output current achievable when Iref=Iin for the prevailing duty cycle D.

3. The current limit reference circuit of claim 1, wherein said switching power converter is a buck converter and Iref represents an associated desired average output current limit, said circuitry arranged to multiply Iref and the complement of duty cycle D such that the resulting product represents the average input current achievable when Iref=Iout for the prevailing duty cycle D.

4. The current limit reference circuit of claim 1, wherein said switching power converter is a boost converter and Iref represents an associated desired average output current limit, said circuitry arranged to divide Iref by the complement of duty cycle D such that the resulting quotient represents the average input current achievable when Iref=Iout for the prevailing duty cycle D.

5. An output-referred input current limit reference circuit for a switching power converter, comprising:
a switching power converter which has an associated input current Iin, an associated output current Iout which is delivered at an output, and an associated duty cycle D;
a reference current (Iin(target)) representing a desired average input current limit; and
circuitry arranged to multiply Iin(target) and the complement of duty cycle D (1-D) such that the resulting product (V(Iout,ach)) represents the average output current achievable when Iin(target)=Iin for the prevailing duty cycle D.

6. The current limit reference circuit of claim 5, wherein said switching power converter is a boost converter.

7. The current limit reference circuit of claim 5, further comprising a comparison circuit which produces an output which indicates whether the average input current limit has been reached.

8. The current limit reference circuit of claim 7, further comprising circuitry arranged to control Iout in response to the output of said comparison circuit.

9. The current limit reference circuit of claim 8, wherein said circuitry comprises a current digital-to-analog converter (DAC).

10. The current limit reference circuit of claim 5, wherein said circuitry comprises:
a switching means which operates synchronously with said switching power converter; and
a first resistance;
said current limit reference circuit arranged such that said reference current is connected across said first resistance when current is being delivered to the output of said switching converter, such that the average voltage developed across said first resistance is proportional to the average output current achievable when Iin(target)=Iin for the prevailing duty cycle D.

11. The current limit reference circuit of claim 10, further comprising a low-pass filter coupled at its input to said first resistance and arranged such that its output (V(target)) is an approximately continuous voltage which is proportional to the product of Iin(target) and the complement of duty cycle D.

12. The current limit reference circuit of claim 11, further comprising:
a second resistance connected to conduct Iout and thereby develop a voltage (V(actual)) which varies with Iout; and
a voltage comparator which receives the output of said low-pass filter at its first input and the voltage on said second resistance at its second input, and which produces an output that indicates whether V(actual) is greater or less than V(target) and thereby whether the average input current limit has been reached.

13. An output-referred input current limit reference circuit for a boost converter, comprising:
- a boost converter which has an associated input current Iin, an associated output current Iout which is delivered at an output, and an associated duty cycle D;
- a reference current (Iin(target)) representing a desired average input current limit;
- a switching means which operates synchronously with said boost power converter;
- a first resistance, said current limit reference circuit arranged such that said reference current is connected across said first resistance when current is being delivered to the output of said boost converter, such that the average voltage V(Iout,ach) developed across said resistance is proportional to the average output current achievable when Iin(target)=Iin for the prevailing duty cycle D;
- a low-pass filter coupled at its input to said resistance and arranged such that its output (V(target)) is an approximately continuous voltage which is proportional to the product of Iin(target) and the complement of duty cycle D (1-D);
- a second resistance connected to conduct Iout and thereby develop a voltage (V(actual)) which varies with Iout; and
- a voltage comparator which receives V(actual) and V(target) at respective inputs and which produces an output that indicates whether V(actual) is greater or less than V(target) and thereby whether the average input current limit has been reached.

14. A camera flash driver circuit which includes an output-referred input current limit reference circuit for a boost converter, comprising:
- a boost converter which has an associated input current Iin, an associated output current Iout which is delivered at an output, and an associated duty cycle D;
- a reference current (Iin(target)) representing a desired average input current limit;
- a switching means which operates synchronously with said boost power converter;
- a first resistance, said current limit reference circuit arranged such that said reference current is connected across said first resistance when current is being delivered to the output of said boost converter, such that the average voltage (V(Iout,ach)) developed across said resistance is proportional to the average output current achievable when Iin(target)=Iin for the prevailing duty cycle D;
- a low-pass filter coupled at its input to said resistance and such that its output (V(target)) is an approximately continuous voltage which is proportional to the product of Iin(target) and the complement of duty cycle D (1-D);
- a second resistance connected to conduct Iout and thereby develop a voltage (V(actual)) which varies with Iout;
- a voltage comparator which receives V(actual) and V(target) at respective inputs and which produces an output that indicates whether V(actual) is greater or less than V(target) and thereby whether the average input current limit has been reached; and
- a current digital-to-analog converter (DAC) arranged to control Iout in response to the output of said comparison circuit.

* * * * *